United States Patent
Goko

(10) Patent No.: US 7,369,636 B2
(45) Date of Patent: May 6, 2008

(54) ASYNCHRONOUS COMMUNICATION CIRCUIT

(75) Inventor: Daishi Goko, Suita (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 699 days.

(21) Appl. No.: 10/874,178

(22) Filed: Jun. 24, 2004

(65) Prior Publication Data

US 2004/0264617 A1    Dec. 30, 2004

(30) Foreign Application Priority Data

Jun. 27, 2003   (JP)  ............... 2003-183650

(51) Int. Cl.
*H04L 25/38*   (2006.01)
(52) U.S. Cl. .................................... 375/370
(58) Field of Classification Search ................ 375/370, 375/354, 371, 373; 327/161, 199
See application file for complete search history.

(56) References Cited

U.S. PATENT DOCUMENTS

| 4,713,702 A | 12/1987 | Ishihara et al. | ............... 360/79 |
|---|---|---|---|
| 5,363,418 A | 11/1994 | Nakano et al. | ............. 375/117 |
| 6,016,309 A * | 1/2000 | Benayoun et al. | .......... 370/252 |
| 6,380,778 B2 * | 4/2002 | Uehara et al. | ............. 327/175 |

* cited by examiner

*Primary Examiner*—David C. Payne
*Assistant Examiner*—Rahel Guarino
(74) *Attorney, Agent, or Firm*—Steptoe & Johnson LLP

(57) ABSTRACT

A counter value of a divider counter 3 that determines a communication speed is compared by a comparator 4 with a value calculated from a difference between fall delay and rise delay, and data is received with a matching signal serving as a data reception shift clock (S201), thereby acquiring receive data on the optimum position. Further, with the data reception shift clock (S201) serving as a data transmission shift clock (S201), the transmission control circuit 5 transmits serial data (S203) from the data transmission shift register 7 as data with a duty ratio reversed from a varied duty ratio of the communication system. Thus, it is possible to transmit data with a normal duty ratio to another communication device.

6 Claims, 9 Drawing Sheets

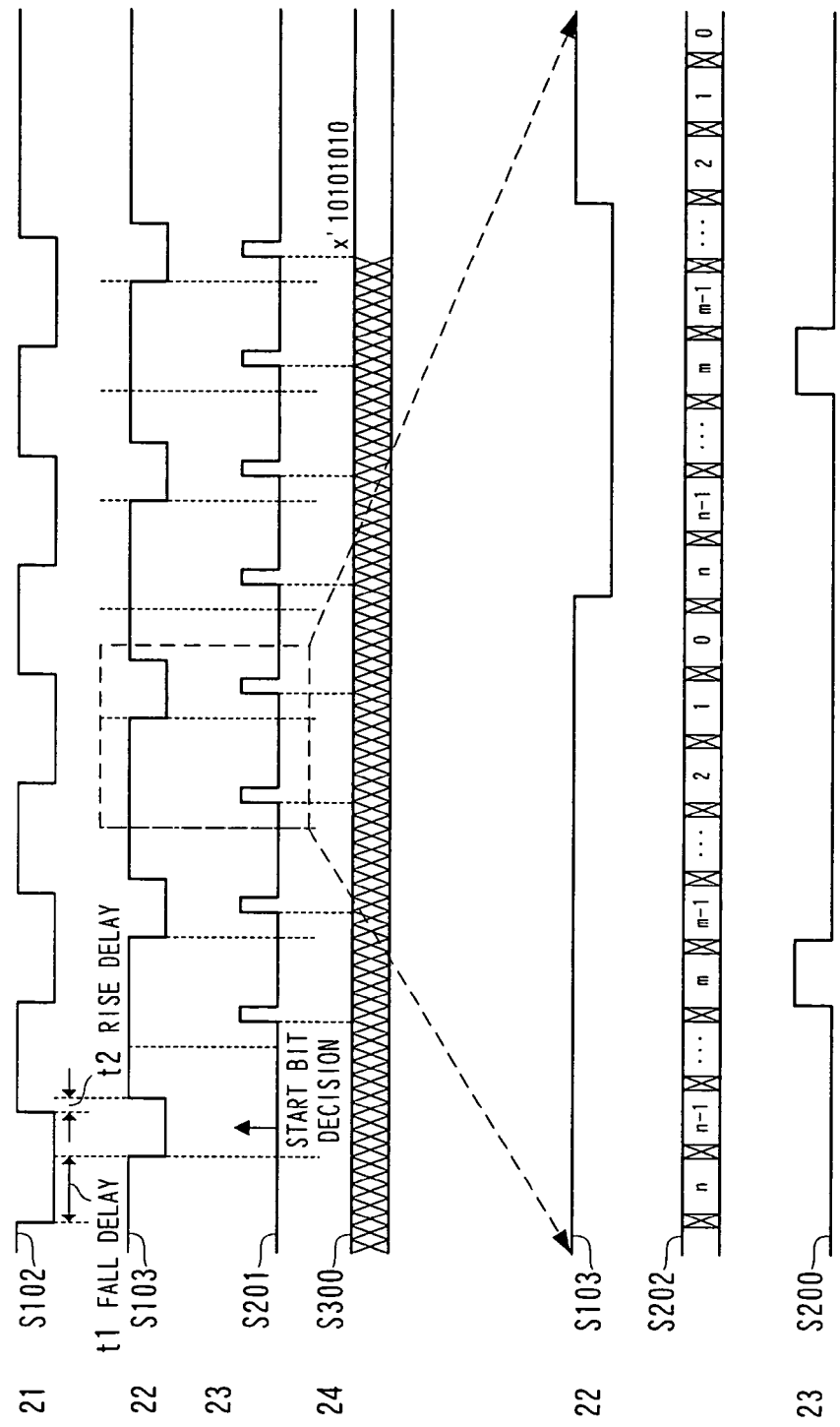

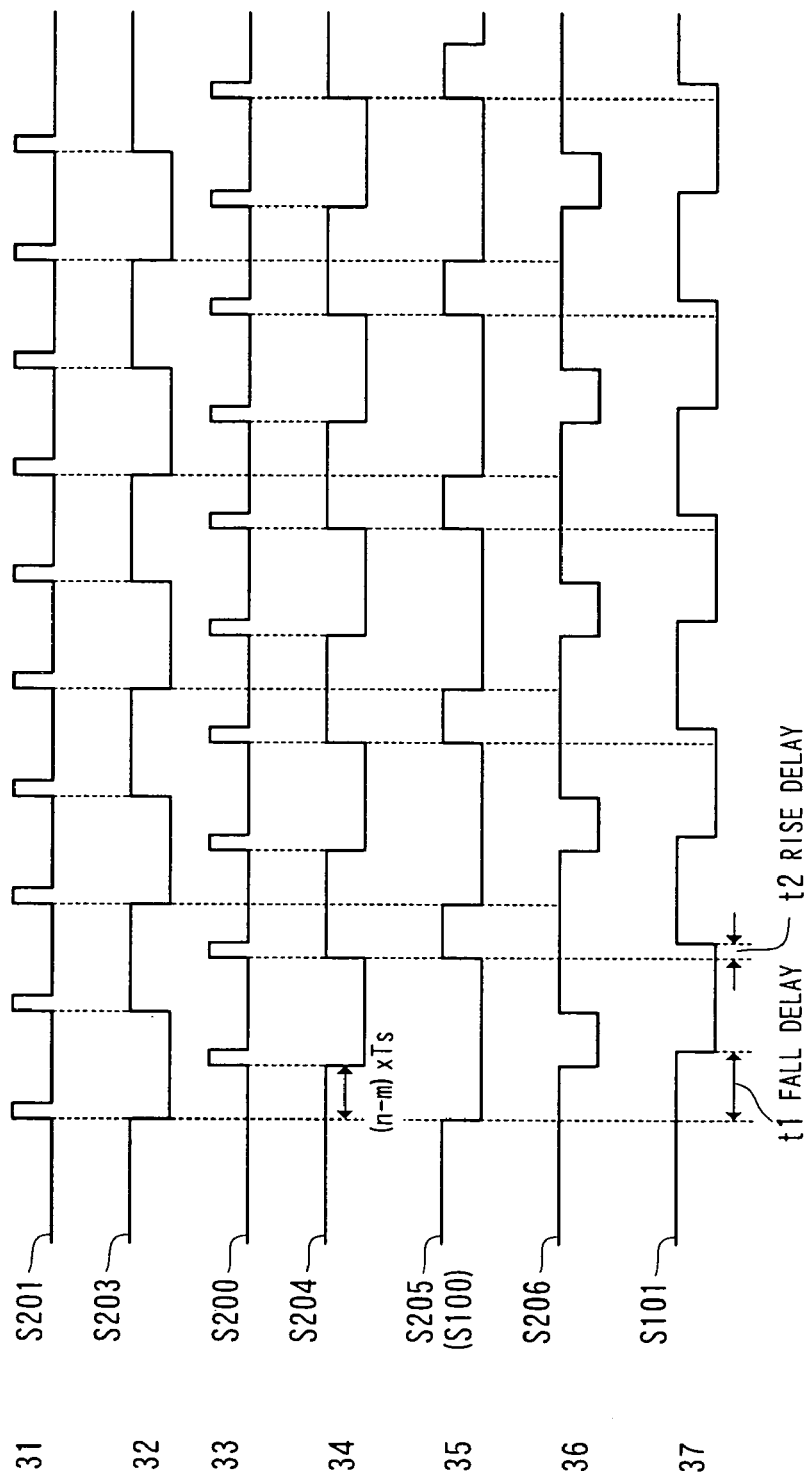

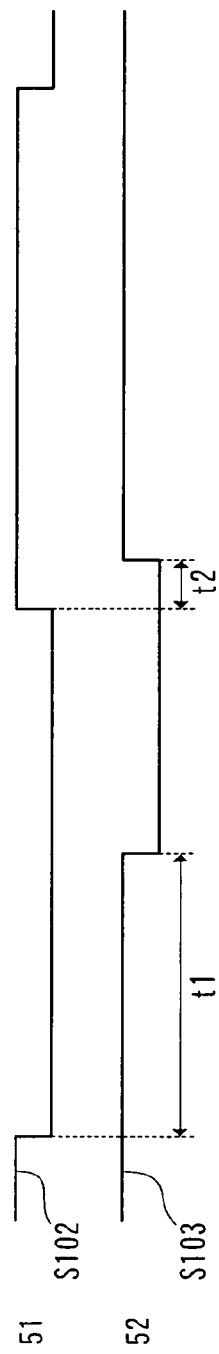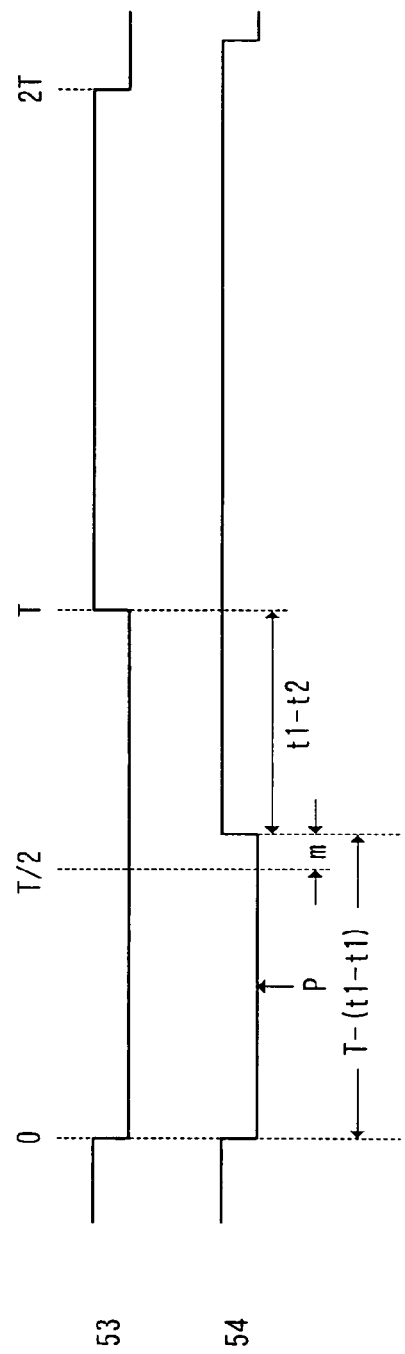

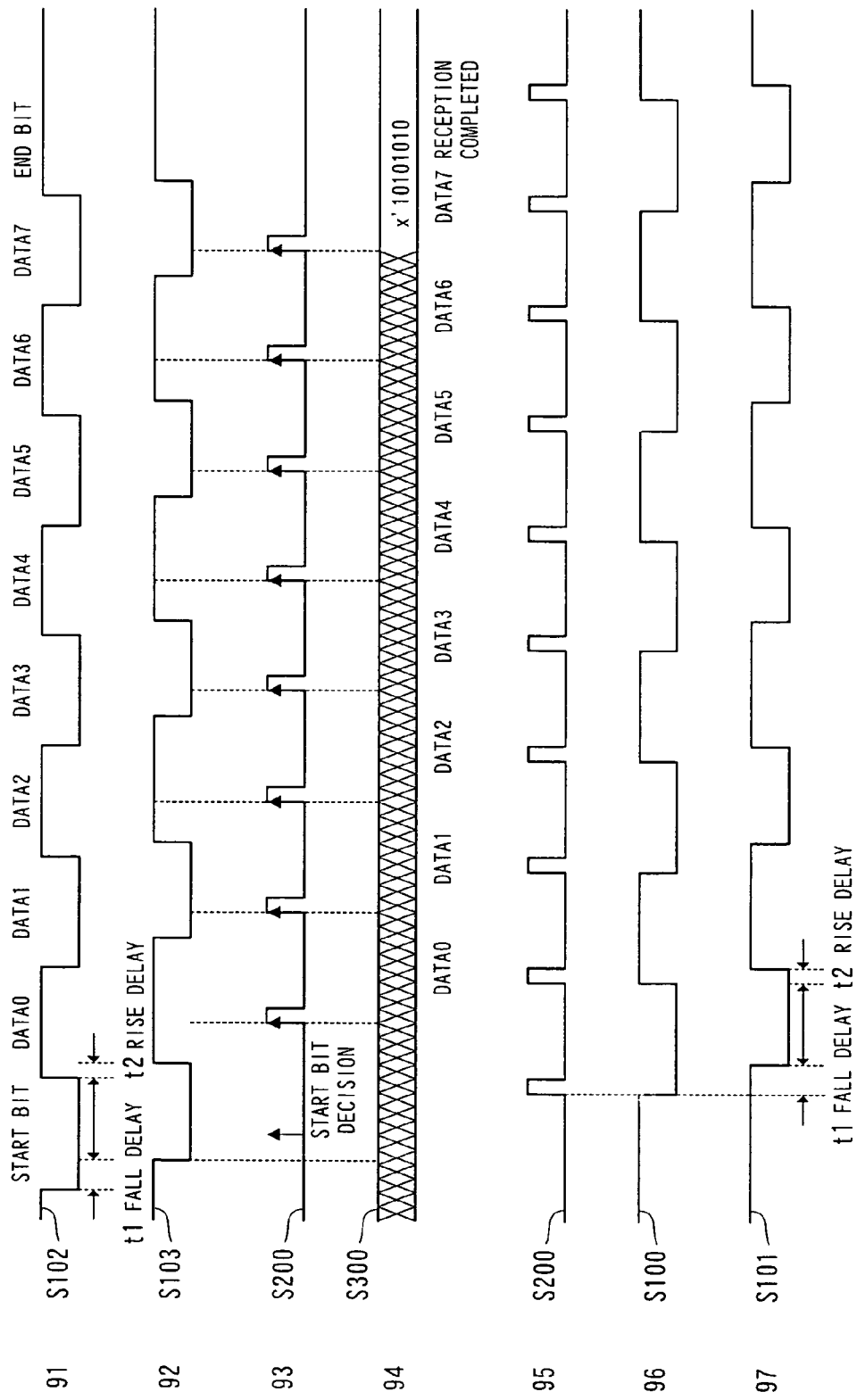

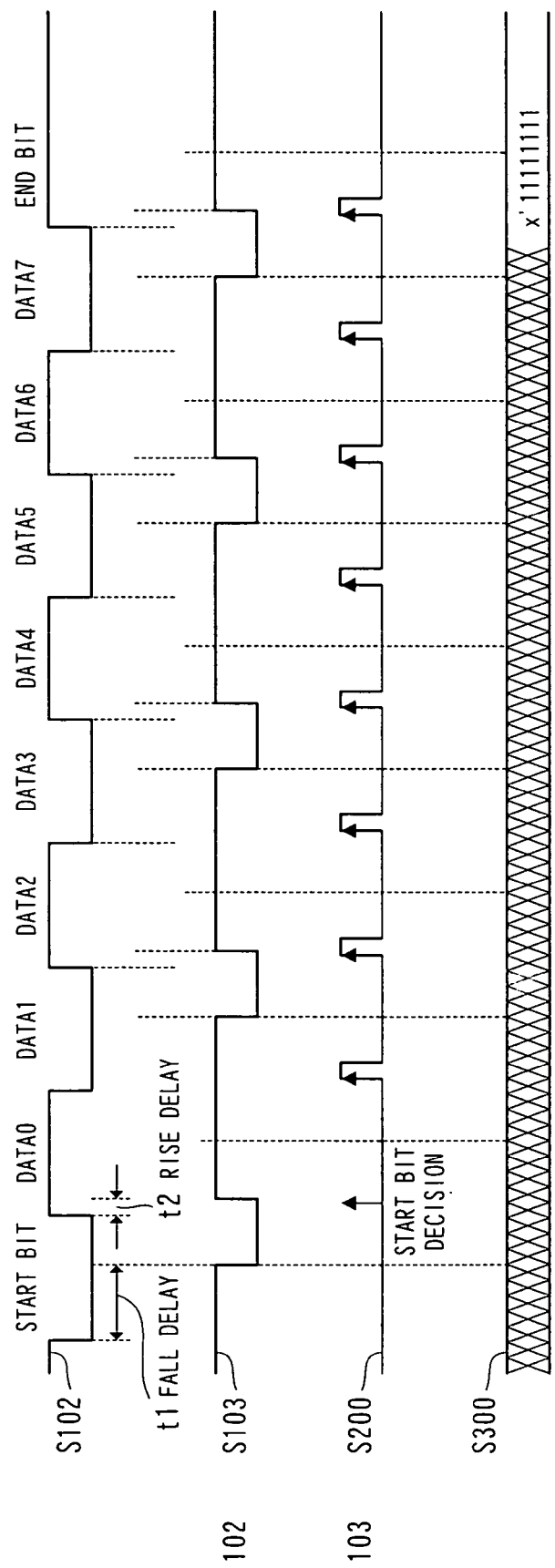

US 7,369,636 B2

ASYNCHRONOUS COMMUNICATION CIRCUIT

FIELD OF THE INVENTION

The present invention relates to the control of the reception timing of an asynchronous communication circuit and the control of a transmission waveform, and particularly relates to an asynchronous communication circuit used for units having different power supply systems, for example, the outdoor unit and the indoor unit of an air conditioner.

BACKGROUND OF THE INVENTION

Referring to FIGS. 6, 7, 8, and 9, a conventional asynchronous communication circuit will be described below.

FIG. 6 is a conceptual illustration for explaining communications between typical asynchronous communication circuits. For example, such asynchronous communication circuits are used for communications between the outdoor unit and the indoor unit of an air conditioner. FIG. 7 is a structural diagram showing the conventional asynchronous communication circuit. FIG. 8 is a signal waveform chart showing an operation of the conventional asynchronous communication circuit. FIG. 9 is a signal waveform chart showing an operation performed when the conventional asynchronous communication circuit has a large duty ratio.

In FIG. 6, transmit data is outputted from a transmitting terminal TXD of an asynchronous communication circuit U1 of an outdoor unit and is received by a receiving terminal RXD of an asynchronous communication circuit U2 of an indoor unit through an insulating component Z2. Further, transmit data is outputted from a transmitting terminal TXD of the asynchronous communication circuit U2 of the indoor unit and is received by the receiving terminal RXD of the asynchronous communication circuit U2 of the indoor unit through an insulating component Z1. Such communications are carried out at a predetermined data rate.

Referring to FIGS. 7 and 8, an operation of the conventional asynchronous communication circuit will be described below.

In FIG. 7, the conventional asynchronous communication circuit is constituted of a divider counter 3 for dividing a clock outputted from a clock generator circuit 1 while using, as a reset signal, a start bit decision signal outputted from a start bit decision circuit 2, a data transmission shift register 7 which uses, as a data transmission shift clock, a clock outputted from the divider counter 3, and a data reception shift register 6 which uses, as a data reception shift clock, a clock outputted from the divider counter 3.

When data is received, data S102 transmitted from the transmitting terminal TXD of the asynchronous communication circuit U2 has a waveform 91 shown in FIG. 8. In FIG. 8, the transmit data represents "10101010." When the serial data passes through the insulating component Z1, a fall delay t1 and a rise delay t2 are added to output data S103 due to the characteristics of the insulating component Z1, and the "H" period and "L" period of the waveform are changed with a varied duty ratio as indicated by 92 of FIG. 8. In receive data inputted to the receiving terminal RXD of the asynchronous communication circuit U1, a start bit is decided by the start bit decision circuit 2 and a start bit decision signal is outputted from the start bit decision circuit 2. The divider counter 3 reset by the start bit decision signal starts dividing a clock signal outputted from the clock generator circuit 1 and outputs data S200 as a data reception shift clock indicated by 93 of FIG. 8. The clock enables data to be acquired at the center of the data S102 having been received according to a predetermined communication speed. The data S103 is received by the data reception shift register 6 according to the clock. In this case, 8-bit reception is carried out and thus the data is stored in the data reception shift register while the reception shift clock is outputted eight times like data S300 indicated as a waveform 94. Thereafter, the data is outputted to an internal circuit and the reception is completed.

When data is transmitted, a clock signal from the clock generator circuit 1 that is defined by a predetermined communication speed is divided by the divider counter 3, and transmit data S100 is transmitted from the data transmission shift register 7 with the divided clock serving as data S200 of the data transmission shift clock indicated as a waveform 95 in FIG. 8. This serial data is transmitted from the transmitting terminal TXD of the asynchronous communication circuit U1 with a waveform 96 of FIG. 8 and is inputted to the insulating component Z2. The fall delay t1 and the rise delay t2 are added as in the reception and data S101 is outputted. The data S101 reaches the receiving terminal RXD of the asynchronous communication circuit U1 with a waveform deformed like a waveform 97 of FIG. 8. The receiving operation of the asynchronous communication circuit U2 is similar to that of the asynchronous communication circuit U1.

Further, the following example is also available: a send/receive clock is automatically set by data in a predetermined format at the start of communications and the changing points of receive data are sampled, so that a receive clock is automatically corrected (patent document 1).

However, in the transmission and reception, the insulating components Z1 and Z2 between the asynchronous communication circuits U2 and U1 are typically different in the rise time t2 and the fall time t1 on a signal waveform. When a delay due to the rise time and the fall time is sufficiently smaller than a communication speed, communications can be carried out by the conventional synchronous communication circuit with no problem. However, when the communication speed increases, a waveform with a largely varied duty ratio in High period and Low period is inputted to the receiving terminal, like a waveform 102 of FIG. 9. Further, data cannot be accurately received by a waveform 103 indicated as the data receiving shift clock S200 in FIG. 9. Thus, when components with a large difference in rise delay and fall delay have to be inserted in a communication system, a communication speed has to be sufficiently low relative to the difference in delay.

DISCLOSURE OF THE INVENTION

An asynchronous communication circuit of the present invention for transmitting and receiving data at arbitrary timing, comprising a clock generator circuit for outputting a clock of an arbitrary period, a start bit decision circuit which reads a start bit of receive data and outputs a start bit decision signal during reception of data, a divider counter which divides the clock and counts the number of clocks in response to the input of the start bit decision signal, a comparator which compares the number of counted clocks and timing instruction data inputted from the outside and outputs a matching signal when a match occurs, and a data reception shift register for receiving data inputted from a data receiving terminal with the matching signal serving as a data reception shift clock, wherein the data reception shift clock is used to read data, so that the receive data is read according to a fluctuation in the duty ratio of the receive data, the fluctuation being caused by a variation in delay on a communication path.

Further, an asynchronous communication circuit of the present invention for transmitting and receiving data at arbitrary timing, comprising a clock generator circuit for outputting a clock of an arbitrary period, a divider counter for dividing the clock, outputting an underflow signal, and counting the number of clocks, a comparator which compares the number of counted clocks and timing instruction data inputted from the outside and outputs a matching signal when a match occurs, a data transmission shift register for outputting data inputted from the outside with the matching signal serving as a data transmission shift clock, a flip-flop which has the underflow signal as a clock input and has the output signal of the data transmission shift register as input data, an AND circuit which has the output signal of the flip-flop and the output signal of the data transmission shift register as input signals, an OR circuit which has the output signal of the flip-flop and the output signal of the data transmission shift register as input signals, and a switching circuit which selects the output signal of the AND circuit or the output signal of the OR circuit and outputs the signal from a data transmitting terminal in response to a duty ratio switching signal inputted from the outside, wherein data inputted from an internal circuit is acquired in synchronization with the data transmission shift clock, the acquired data is shifted by the flip-flop with the underflow signal serving as a clock input, the data is ORed and ANDed with the output signal of the data transmission shift register, the output signals are used as transmit data for a large fall delay and transmit data for a large rise delay, respectively, and one of the transmit data is selected according to the characteristic of a delay on the communication path.

According to the asynchronous communication circuit of claim 1, the input timing of the timing instruction data is set at an absolute value which is half a difference between the rise delay time and the fall delay time of the receive data.

According to the asynchronous communication circuit of claim 2, the duty ratio switching signal has a value determined by the polarity of a difference between the rise delay time and the fall delay time of the receive data.

According to the asynchronous communication circuit of claim 1, the input timing of the timing instruction data is set at an absolute value which is half a difference between a High period and a Low period, the High period and Low period being measured for 1 bit of the receive data.

According to the asynchronous communication circuit of claim 2, the duty ratio switching signal has a value determined by the polarity of a difference between a High period and a Low period, the High period and Low period being measured for 1 bit of the receive data.

As described above, even in the case of a system where a communication path has a circuit largely varied in duty ratio, it is possible to ease the constraints on communication speed without producing a circuit for correcting a duty ratio.

BRIEF DESCRIPTION OF THE DRAWINGS

FIG. 2 is a signal waveform chart showing a receiving operation of the asynchronous communication circuit according to the present invention;

FIG. 3 is a signal waveform chart showing a transmitting operation of the asynchronous communication circuit according to the present invention;

FIG. 4A is an enlarged view showing the waveforms of data which is transmitted from the asynchronous communication circuit of the present invention;

FIG. 4B is an enlarged view showing the waveforms of data which is transmitted from the asynchronous communication circuit of the present invention with aligned falling edges;

FIG. 8 is a signal waveform chart showing an operation of the conventional asynchronous communication circuit; and FIG. 9 is a signal waveform chart showing an operation performed when the conventional asynchronous communication circuit has a large duty ratio.

DESCRIPTION OF THE EMBODIMENT

Referring to FIGS. 1, 2, 3, 4, 5, and 6, an embodiment of the present invention will be described below.

Figure 1:
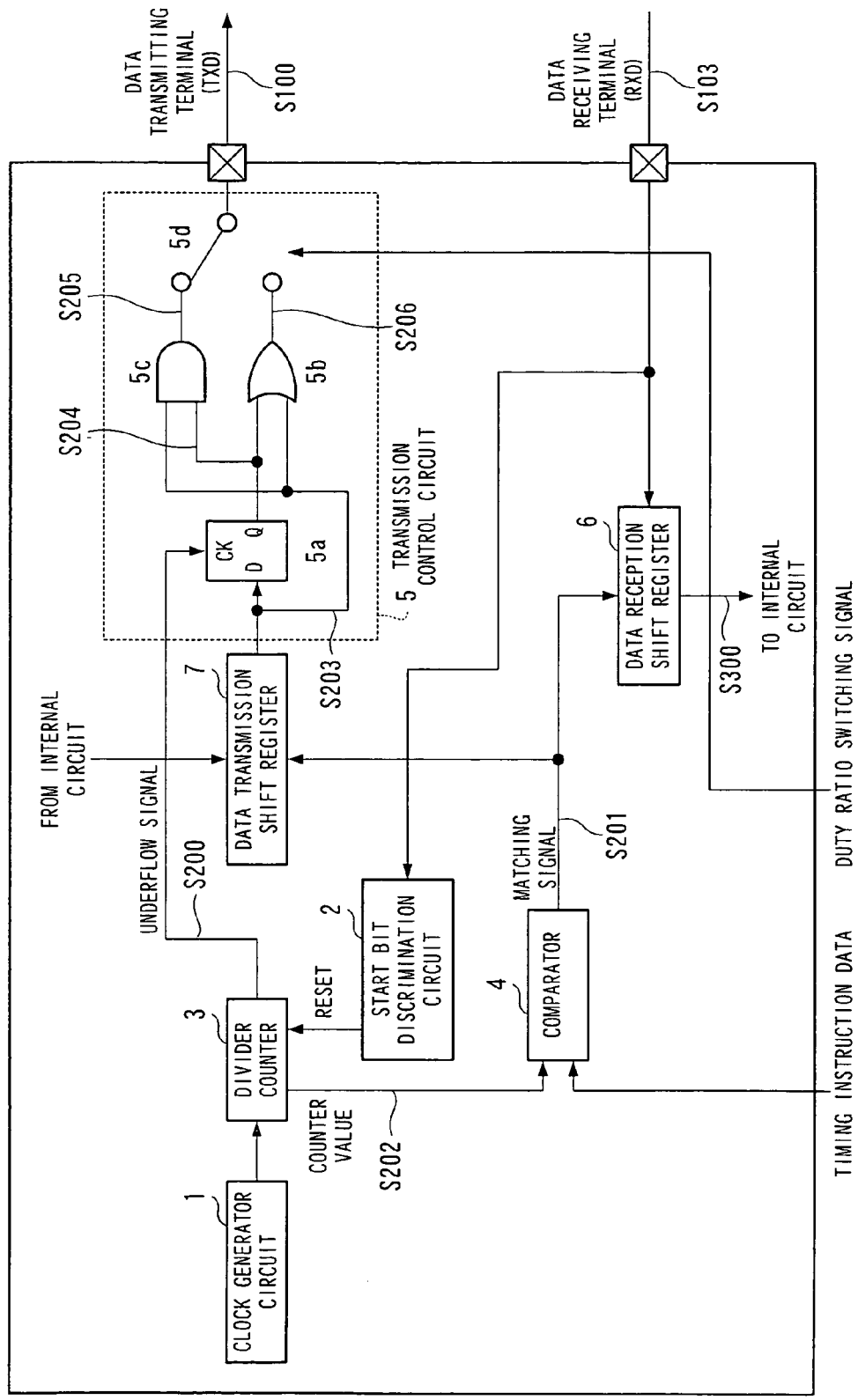
FIG. 1 is a structural diagram showing an asynchronous communication circuit of the present invention.
Figure 5:
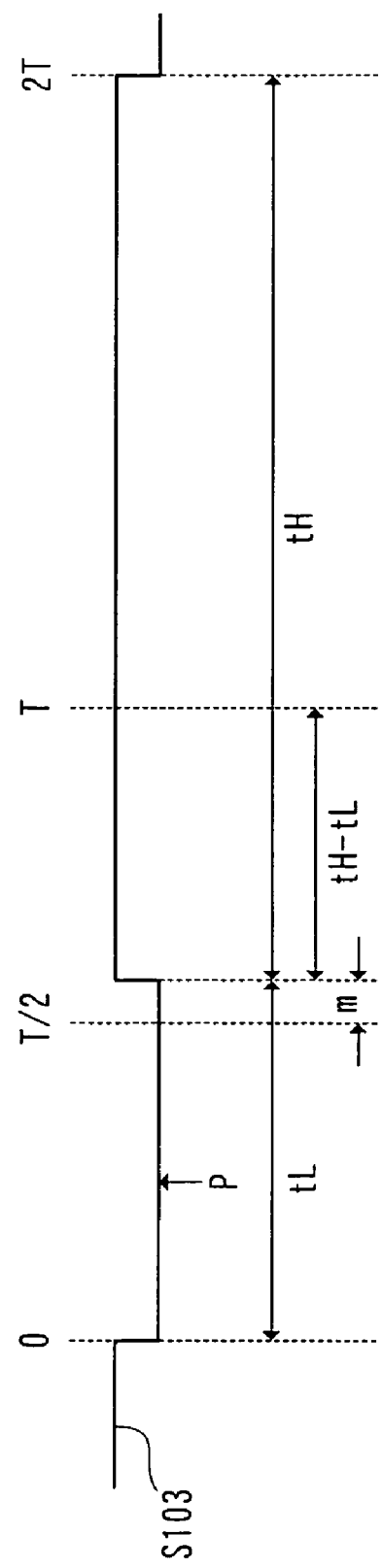
FIG. 5 is an enlarged view showing the waveforms of data which is received from the asynchronous communication circuit of the present invention.

FIG. 1 is a structural diagram showing an asynchronous communication circuit of the present invention. FIG. 2 is a signal waveform chart showing a receiving operation of the asynchronous communication circuit according to the present invention. FIG. 3 is a signal waveform chart showing a transmitting operation of the asynchronous communication circuit according to the present invention. FIG. 4A is an enlarged view showing the waveforms of data which is transmitted from the asynchronous communication circuit of the present invention. FIG. 4B is an enlarged view showing the waveforms of data which is transmitted from the asynchronous communication circuit of the present invention with aligned falling edges. FIG. 5 is an enlarged view showing the waveforms of data which is received from the asynchronous communication circuit of the present invention.

Reference numeral 1 denotes a clock generator circuit, reference numeral 2 denotes a start bit decision circuit, reference numeral 3 denotes a divider counter, reference numeral 4 denotes a comparator, reference numeral 5 denotes a transmission control circuit in which reference numeral 5a denotes a D-FF circuit, reference numeral 5b denotes an OR circuit, reference numeral 5c denotes an AND circuit, and reference numeral 5d denotes a switching circuit, reference numeral 6 denotes a data reception shift register, and reference numeral 7 denotes a data transmission shift register.

The following will describe the receiving operation, the transmitting operation, calculation of timing instruction data, and a method of producing a duty ratio switching signal.

(1) Receiving Operation

The asynchronous communication circuit of the present embodiment is constituted of the clock generator circuit 1 for outputting a clock according to a predetermined communication speed, the start bit decision circuit 2 for discriminating a start bit from receive data and outputting a start bit decision signal, the divider counter 3 which is reset by the start bit decision signal of the start bit decision circuit 2 and divides the clock outputted from the clock generator circuit 1 into 1/n, the comparator 4 for comparing a counter value of the divider counter 3 and a value of timing instruction data which is outputted from the outside to set the phase of a data reception shift clock, and the data reception shift register 6 for receiving data from a data receiving terminal RXD while using, as a data reception shift clock, a signal outputted from the comparator 4.

Regarding the asynchronous communication circuit configured thus, the receiving operation will be described in detail with reference to the system structural diagram of FIG. 6 and the timing chart of FIG. 2.

Hereinafter, in the system structural diagram of FIG. 6, a asynchronous communication circuit U2 is a conventional circuit and an asynchronous communication circuit U1 is the circuit shown in FIG. 1 of the present invention. Further, for convenience of explanation, transmitted data will be described as 8-bit transmit data with no parity.

As described in the conventional art, data S102 from the transmitting terminal TXD of the asynchronous communication circuit U2 is transmitted with a waveform having a normal duty ratio, as indicated by a waveform 21 of FIG. 2. The signal reaches the receiving terminal RXD of the asynchronous communication circuit U1, that is, the receiving terminal RXD of FIG. 1 through the insulating component Z1. Data S103 having reached the receiving terminal at this point has a waveform varied by a fall delay t1 and a rise delay t2 as indicated by a waveform 22 of FIG. 2.

The divider counter 3, which has been reset by the start bit decision signal in the start bit decision circuit, starts counting clocks from the clock generator circuit 1, and a counter value is compared with a value of timing instruction data in the comparator 4. Assuming that the timing instruction data has a value of m (m<n), when the data S202 has m as a counter value of the divider counter 3, a matching signal is outputted from the comparator 4. The matching signal S201 serves as a receive data shift clock indicated by a waveform 23 of FIG. 2. Receive data is captured at the rising edge of the receive data shift clock by the data reception shift register 6, receive data S300 is loaded into an internal circuit after the data is received, and reception is correctly performed like a waveform 24 of FIG. 2.

As described above, according to the present embodiment, a clock outputted from the clock generator circuit 1 is divided into 1/n, the clock outputted from the clock generator circuit 1 is compared with the value m of timing instruction data, and the matching signal is used as a data reception shift clock, so that data can be correctly received by generating a receiving clock according to the waveform, in response to a deformed waveform due to a delay of the insulating components and so on of the communication system. Even in the case of a system where a communication path has a circuit largely varied in duty ratio, it is possible to ease the constraints on communication speed without producing a circuit for correcting a duty ratio.

(2) Transmitting Operation

The circuit configuration required for a transmitting operation is constituted of the clock generator circuit 1 for outputting a clock according to the predetermined communication speed, the divider counter 3 for dividing the clock outputted from the clock generator circuit 1 into 1/n, the comparator 4 for comparing a counter value of the divider counter 3 and a value of timing instruction data for setting the phase of the data reception shift clock, the data transmission shift register 7 for outputting serial data while using, as a data transmission shift clock, a signal outputted from the comparator 4, the D-FF circuit 5a which has, as a clock, an underflow signal of the counter value outputted from the divider counter 3 and has, as data input, the serial data outputted from the data transmission shift register 7, the AND circuit 5c and the OR circuit 5b to which the output of the D-FF circuit 5a and the serial data outputted from the data transmission shift register 7 are inputted, and the switching circuit 5d for switching the inputs of the AND circuit 5c and the OR circuit 5b in response to a duty ratio switching signal.

Regarding the asynchronous communication circuit configured thus, the transmitting operation will be described in detail with reference to the system structural diagram of FIG. 6, the signal waveform chart of FIG. 3, and FIG. 1.

As in the receiving operation, assuming that the timing instruction data has a value of m, when the data S202 has m as a counter value of the divider counter 3 for dividing a clock from the clock generator circuit 1 into 1/n, the data transmission shift register 7 outputs serial data S203 while using the matching signal 201 from the comparator 4 as a waveform 31 serving as a data transmission shift clock of FIG. 3. This waveform is a waveform 32 of FIG. 3. Further, when the clock generator circuit 1 has a clock period of Ts, output data S204 of the D-FF circuit 5a has a serial data waveform with a delay of (n−m)×Ts as indicated by a waveform 34 of FIG. 3. The D-FF circuit Sa has, as a clock, the data S200 which is the underflow output of the divider counter 3 and is indicated as a waveform 33, and the D-FF circuit Sa has, as data input, serial data S203 outputted from the data transmission shift register 7. Output data S205 of the AND circuit 5c for the signals of S203 and S204 has a waveform 35 of FIG. 3, and output data S206 of the OR circuit 5b has a waveform 36 of FIG. 6. The output data S205 and S206 are switched by the switching circuit 5d in response to the duty ratio switching signal.

Figure 6:
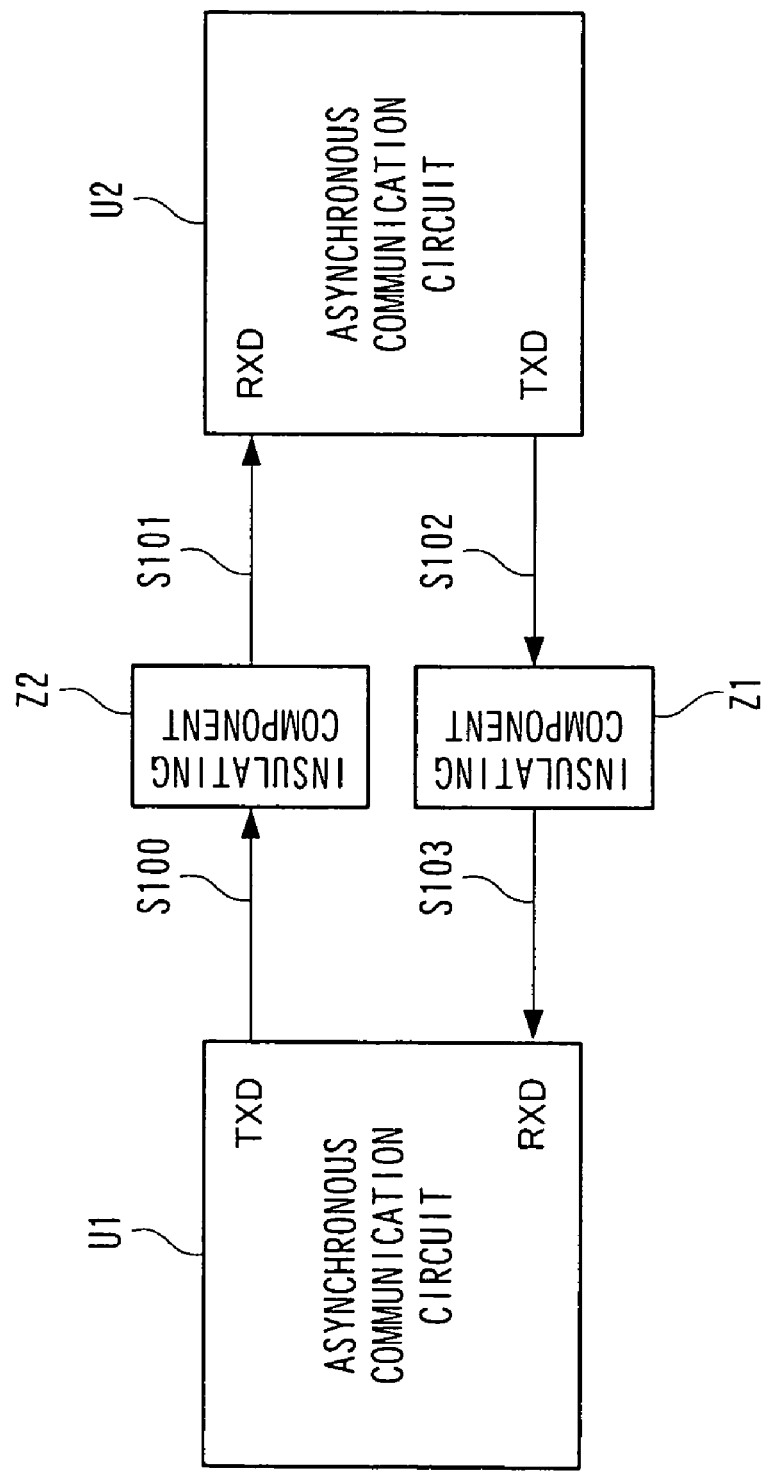
FIG. 6 is a conceptual illustration for explaining communications between typical asynchronous communication circuits.
Figure 7:
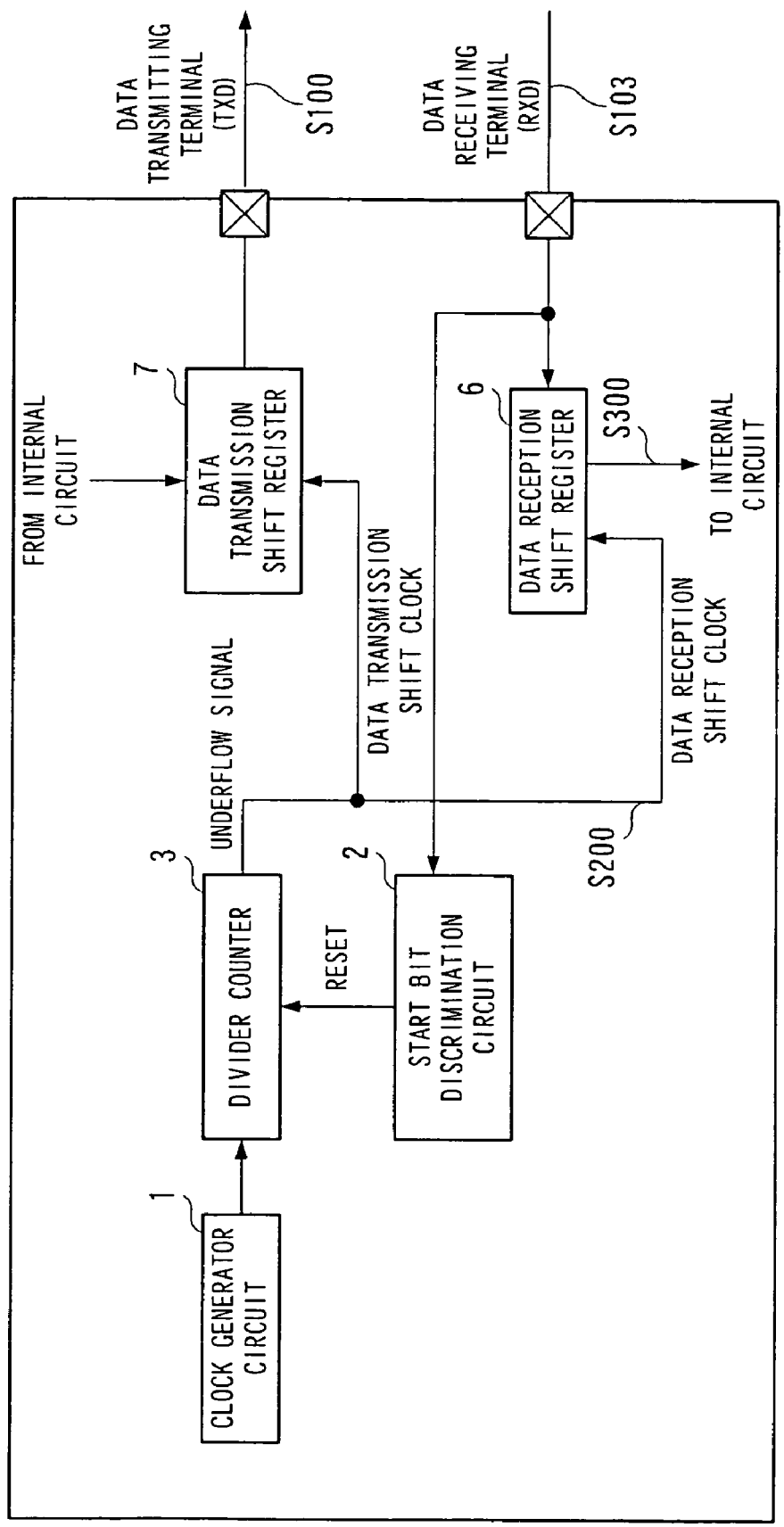
FIG. 7 is a structural diagram showing a conventional asynchronous communication circuit.

When the fall delay is larger than the rise delay in the communication system of FIG. 6, the waveform of S205 is selected and the waveform 35 of FIG. 3 is outputted as data S100 to the transmitting terminal TXD. Thereafter, the predetermined delay values t1 and t2 are added by the insulating component Z2 and are outputted as the data S101. A waveform with a normal duty ratio reaches the data receiving terminal RXD-of the asynchronous communication circuit U2, as indicated by a waveform 37 of FIG. 3.

Conversely, when the rise delay is larger than the fall delay in the communication system of FIG. 6, the waveform of S206 is selected and the waveform 36 of FIG. 3 is outputted as the data S100 to the transmitting terminal TXD. Similarly, a waveform with a normal duty ratio reaches the data receiving terminal RXD of the asynchronous communication circuit U2.

As described above, according to the present embodiment, the output signal from the D-FF circuit 5a and the output signal from the data transmission shift register 7 are ORed or ANDed while using the matching signal of the comparator 4 as a clock. The output signal of the D-FF circuit 5a has, as an input signal, the signal outputted from the data transmission shift register 7 with the matching signal of the comparator 4 serving as a clock, and has the underflow signal of the divider counter 3 as a clock. The output signals are used as transmit data used for a large fall delay and transmit data used for a large rise delay, respectively. One of the transmit data is selected by the duty ratio switching signal according to the characteristic of a delay of the communication path, so that a deformed waveform of communication data can be corrected upon data transmission. Even in the case of a system where a communication path has a circuit largely varied in duty ratio, it is possible to ease the constraints on communication speed without producing a circuit for correcting a duty ratio.

(3) Methods of Calculating Timing Instruction Data and a Duty Ratio Switching Signal Referring to FIGS. 4 and 6, the following will describe a method of calculating timing instruction data inputted to the comparator 4 of FIG. 1 and a method of calculating the duty ratio switching signal inputted to the switching circuit 5d. A waveform 51 of FIG. 4A is an enlarged view showing the waveform of 2 bits of data S102 transmitted from the asynchronous communication circuit U2 of FIG. 6. This data is equivalent to data S103 outputted with the addition of the fall delay time t1 and the rise delay time t2, which are determined in advance as product specifications. The data S103 has a waveform 52 of FIG. 4A.

FIG. 4B shows that the falling edges of the two waveforms are aligned while t1>t2 is satisfied. Assuming that the fall time is 0 and a 1-bit period is T, a waveform 53 with a normal duty ratio has a fall time of T and a subsequent fall time of 2T. A difference in the L period of a waveform 54 varied in duty ratio is calculated by t1−t2. Receive data is captured most suitably at the center of data, e.g., position P of the waveform 54. Thus, it is desirable to capture receive data at the half of the difference between the 1-bit period T and (t1−t2), that is, according to the equation below. Time P is expressed by the following equation.

$$P=(T-(t1-t2))/2$$

Assuming that the divider counter of the present invention is a down counter, the set value m of a compare register is equal to a difference between the value P and T/2, which is half the 1-bit period. This relationship is expressed by the equation below.

$$m=T/2-P$$
$$=T/2-(T-(t1-t2))/2$$
$$=(t2-t1)/2$$

Therefore, the value m set for the compare register is half a difference between the fall delay time t1 and the rise delay time t2 of the communication system.

Further, a polarity obtained by the equation of m is determined by t2−t1. In the case of fall delay time t1>rise delay time t2, that is, when 1-bit data has a short L period, negative polarity is obtained. In the case of delay time t1<rise delay time t2, that is, when the L period is long, positive polarity is obtained. By using this polarity, the duty ratio switching signal is outputted so that the switching signal of the switching circuit 5d selects an OR output for the positive polarity and selects an AND output for the negative polarity.

As described above, a difference between the predetermined rise delay time and fall delay time of the communication system is used as timing instruction data, so that stable reception timing can be obtained with a simple setting. Further, the polarity of the same calculation result can be used for the duty ratio switching signal, so that a transmission waveform can be outputted with a duty ratio reversed from a varied duty ratio of the communication system. Even in the case of a system where a communication path has a circuit largely varied in duty ratio, it is possible to ease the constraints on communication speed without producing a circuit for correcting a duty ratio.

Meanwhile, when the rise time and the fall time are not specified beforehand as product specifications, the timing instruction data inputted to the comparator 4 of FIG. 1 and the duty ratio switching signal inputted to the switching circuit 5d can be calculated also using the H period and the L period for 1 bit of the receive data in the communication system. This will be described below with reference to FIGS. 5 and 6.

A waveform 61 of FIG. 5 shows 2 bits of the receive data S103 (data is 01). The L period has time tL and the H period has time tH. Assuming that the fall time is 0 and a 1-bit period is T, time from the falling edge to another of the data is 2T, which is not changed even by a varied duty ratio (tH>tL). In this case, tH−tL represents how short the L period relative to the 1-bit period T. It is desirable to acquire the receive data on the position P at the center of the L period. Thus, time P is present at the half of a difference between T and (tH−tL), that is, the time P is expressed by the equation below.

$$P=(T-(tH-tL))/2$$

Moreover, when the divider counter is a down counter, the set value m of the compare register is equal to a difference between the value P and T/2, which is half the 1-bit period. Hence, the value m can be expressed by the equation below.

$$m=T/2-P$$
$$m=T/2-(T-(tH-tL))/2$$
$$=(tL-tH)/2$$

Therefore, the value m of the timing instruction data is half a difference between the H period tH of 1 bit and the L period tL of 1 bit in the communication system.

Further, a polarity obtained by the equation of m is determined by tL−tH. In the case of tH>tL, that is, when the L period is short, negative polarity is obtained. In the case of tH<tL, that is, when the L period is long, positive polarity is obtained. By using this polarity, the duty ratio switching signal is outputted so that the switching signal of the switching circuit 5d selects an OR output for the positive polarity and selects an AND output for the negative polarity.

As described above, even when rise time and fall time are not specified beforehand in the communication system, the time of H period and the time of L period are calculated for 1 bit and a time difference is used as timing instruction data, thereby achieving the optimum reception timing. Further, the polarity of the same calculation result can be used for the duty ratio switching signal, so that a transmission waveform can be outputted with a duty ratio reversed from a varied duty ratio of the communication system.

What is claimed is:

1. An asynchronous communication circuit for transmitting and receiving data at arbitrary timing, comprising:
   a clock generator circuit which outputs a clock signal
   a start bit decision circuit which reads a start bit of receive data and outputs a start bit decision signal during reception of data
   a divider counter which divides the clock signal and counts a number of clock cycles of the clock signal in response to an input of the start bit decision signal
   a comparator which compares the number of counted clocks cycles and an externally generated timing instruction data and outputs a matching signal when a match occurs and
   a data reception shift register which receives data inputted from a data receiving terminal with the matching signal serving as a data reception shift clock,
   wherein the data reception shift clock is used to read data, and the receive data is read accounting for a fluctuation in a duty ratio of the receive data, the fluctuation being caused by a variation in delay on a communication path.

2. An asynchronous communication circuit for transmitting and receiving data at arbitrary timing, comprising:
a clock generator circuit which outputs a clock signal
a divider counter which divides the clock signal, outputs a clock input signal, and counts a number of cycles of the clock signal,
a comparator which compares the number of counted clocks cycles and an externally generated timing instruction data and outputs a matching signal when a match occurs,
a data transmission shift register which outputs data inputted from an internal circuit with the matching signal serving as a data transmission shift clock,
a flip-flop which has the clock input signal as a clock and an output signal of the data transmission shift register as input data,
an AND circuit which has an output signal of the flip-flop and the output signal of the data transmission shift register as input signals,
an OR circuit which has the output signal of the flip-flop and the output signal of the data transmission shift register as input signals, and
a switching circuit which selects an output signal of the AND circuit or an output signal of the OR circuit and outputs the signal to a data transmitting terminal in response to a duty ratio switching signal inputted from the external source,
wherein data inputted from the internal circuit is acquired in synchronization with the data transmission shift clock, the acquired data is shifted by the flip-flop with the clock input signal serving as a clock, the shifted data is ORed and ANDed with the output signal of the data transmission shift register, the output signals are used as a first transmit data to account for a fall delay and a second transmit data to account for a rise delay, respectively, and one of the transmit data is selected according to a characteristic of a delay on a communication path.

3. The asynchronous communication circuit according to claim 1, wherein input timing of the timing instruction data is set at an absolute value which is half a difference between rise delay time and fall delay time of the receive data.

4. The asynchronous communication circuit according to claim 2, wherein the duty ratio switching signal has a value determined by a polarity of a difference between rise delay time and fall delay time of the receive data.

5. The asynchronous communication circuit according to claim 1, wherein input timing of the timing instruction data is set at an absolute value which is half a difference between a High period and a Low period, the High period and Low period being measured for 1 bit of the receive data.

6. The asynchronous communication circuit according to claim 2, wherein the duty ratio switching signal has a value determined by a polarity of a difference between a High period and a Low period, the High period and Low period being measured for 1 bit of the receive data.

* * * * *